United States Patent
Wong et al.

(10) Patent No.: US 11,917,659 B2
(45) Date of Patent: *Feb. 27, 2024

(54) TELECOMMUNICATIONS APPARATUS AND METHODS INCLUDING SELECTING A TBS BASED ON AN INDICATED MAXIMUM TBS

(71) Applicant: Sony Group Corporation, Tokyo (JP)

(72) Inventors: Shin Horng Wong, Basingstoke (GB); Martin Warwick Beale, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/952,315

(22) Filed: Sep. 26, 2022

(65) Prior Publication Data

US 2023/0050898 A1  Feb. 16, 2023

Related U.S. Application Data

(63) Continuation of application No. 17/044,341, filed as application No. PCT/EP2019/058085 on Mar. 29, 2019, now Pat. No. 11,457,449.

(30) Foreign Application Priority Data

Apr. 6, 2018  (EP) .................................... 18166211

(51) Int. Cl.
*H04W 72/52* (2023.01)
*H04W 76/28* (2018.01)
(Continued)

(52) U.S. Cl.
CPC .......... *H04W 72/52* (2023.01); *H04L 5/0044* (2013.01); *H04W 72/0453* (2013.01);
(Continued)

(58) Field of Classification Search
CPC ............ H04W 72/52; H04W 72/0453; H04W 72/0473; H04W 72/23; H04W 76/28;
(Continued)

(56) References Cited

U.S. PATENT DOCUMENTS

2014/0075085 A1* 3/2014 Schroder ............... H04L 49/101
710/317
2015/0334771 A1  11/2015 Li et al.
(Continued)

OTHER PUBLICATIONS

International Search Report and Written Opinion dated Aug. 9, 2019 for PCT/EP2019/058085 filed on Mar. 29, 2019, 17 pages.
(Continued)

*Primary Examiner* — Kiet Tang
(74) *Attorney, Agent, or Firm* — XSENSUS LLP

(57) ABSTRACT

A method of operating a terminal device for transmitting a first amount of data, the method comprising receiving an indication of an allocation of communications resources, the allocated communications resources sufficient for transmitting a second amount of data, the second amount of data greater than or equal to the first amount of the data, selecting from a plurality of permitted TBS values a transport block size, TBS, for the transmission of the first amount of data, based on the first amount, determining communications resources for transmitting the first amount of the data based on the selected TBS and the allocated communications resources, and transmitting the first amount of the data using the determined communications resources.

20 Claims, 6 Drawing Sheets

(51) Int. Cl.
  *H04L 5/00* (2006.01)
  *H04W 72/0453* (2023.01)
  *H04W 72/044* (2023.01)
  *H04W 72/23* (2023.01)

(52) U.S. Cl.
  CPC ....... *H04W 72/0473* (2013.01); *H04W 72/23* (2023.01); *H04W 76/28* (2018.02)

(58) Field of Classification Search
  CPC . H04W 72/543; H04W 4/70; H04W 72/0446; H04L 5/0044; H04L 1/0067; H04L 1/08; H04L 5/0091; H04L 1/0013; H04L 1/0008; H04L 1/0061; H04L 49/101
  See application file for complete search history.

(56) References Cited

U.S. PATENT DOCUMENTS

| | | | |
|---|---|---|---|
| 2019/0159260 A1* | 5/2019 | Charbit | H04L 1/0032 |
| 2019/0182899 A1* | 6/2019 | Ye | H04W 4/80 |
| 2020/0244420 A1 | 7/2020 | Wang et al. | |

OTHER PUBLICATIONS

2010—LTE for UMTS OFDMA and SC-FDMA.
3GPP TS 36.213 "Physical layer procedures (Rel-14)".
3GPP TSG Meeting #92bis Sanya, China Apr. 16-20, 2018 Title: Early Data Transmission TBS Determination Document for Discussion and Decision.
Holma H. and Toskala. A, "LTE for UMTS OFDMA and SC-FDMA based radio access", John Wiley and Sons, 2009.
RP-161464, "Revised WID for Further Enhanced MTC for LTE," Ericsson, 3GPP TSG RAN Meeting #73, New Orleans, USA, Sep. 19-22, 2016.
RP-161901, "Revised work item proposal: Enhancements of NB-IoT", Huawei, HiSilicon, 3GPP TSG RAN Meeting #73, New Orleans, USA, Sep. 19-22, 2016.
RP-170732, "New WID on Even further enhanced MTC for LTE," Ericsson, Qualcomm, 3GPP TSG RAN Meeting #75, Dubrovnik, Croatia, Mar. 6-9, 2017.
RP-170852, "New WID on Further NB-IoT enhancements," Huawei, HiSilicon, Neul, 3GPP TSG RAN Meeting #75, Dubrovnik, Croatia, Mar. 6-9, 2017.
RP-180045—3GPP Meeting #79 Chennai India Mar. 19-22, 2018.

* cited by examiner

TELECOMMUNICATIONS APPARATUS AND METHODS INCLUDING SELECTING A TBS BASED ON AN INDICATED MAXIMUM TBS

CROSS-REFERENCE TO RELATED APPLICATIONS

The present application is a continuation of U.S. application Ser. No. 17/044,341, filed Oct. 1, 2020, which is based on PCT filing PCT/EP2019/058085, filed Mar. 29, 2019, which claims priority to EP 18166211.5, filed Apr. 6, 2018, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data-rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems.

Future wireless communications networks will therefore be expected to routinely and efficiently support communications with a wider range of devices associated with a wider range of data traffic profiles and types than current systems are optimised to support. For example it is expected that future wireless communications networks will efficiently support communications with devices including reduced complexity devices, machine type communication (MTC) devices, high resolution video displays, virtual reality headsets and so on. Some of these different types of devices may be deployed in very large numbers, for example low complexity devices for supporting the "Internet of Things", and may typically be associated with the transmission of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data. It is further expected some of these types of device may be required to operate in areas of relatively poor coverage, for example, in a basement or other location with relatively high penetration loss (e.g. for smart meter type applications), or in remote locations (e.g. for remote monitoring applications), and this has given rise to proposals for enhancing coverage, for example using repeat transmissions.

The increasing use of different types of terminal devices associated with different traffic profiles and requirements for coverage enhancement gives rise to new challenges for efficiently handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
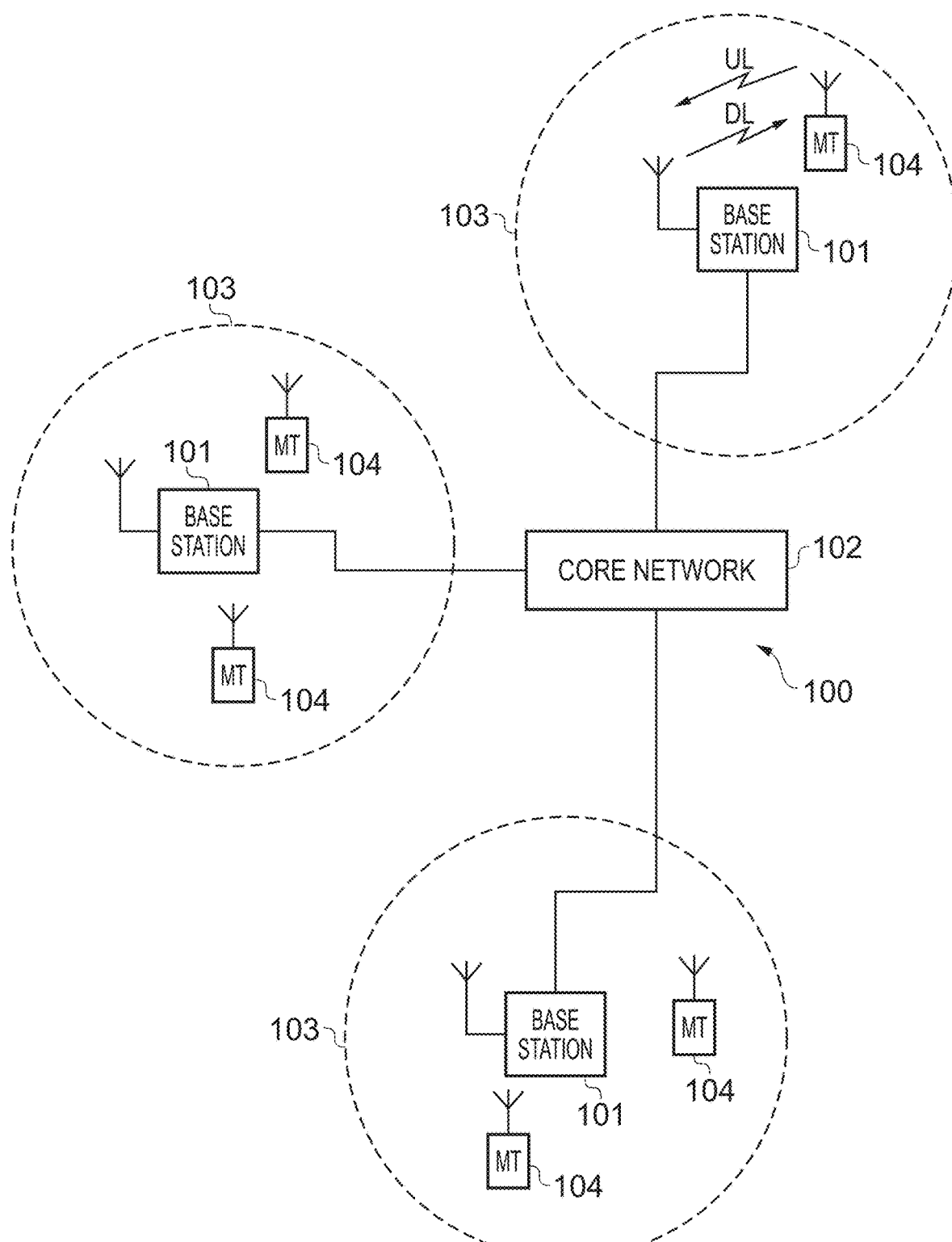
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminals, mobile radios, communications devices, and so forth. Base stations, which are an example of network infrastructure equipment/network access nodes, may also be referred to as transceiver stations nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

While certain embodiments may be generally described herein in relation to the network architecture represented in FIG. 1, it will be appreciated corresponding approaches may equally be adopted in networks conforming to other overall configurations, for example configurations associated with proposed approaches for new radio access technology (RAT), NR, wireless mobile telecommunications networks/systems. A new RAT network may comprise communication cells that each comprise a controlling node in communication with a core network component and a plurality of distributed units (radio access nodes/remote transmission and reception points (TRPs)) within the cell. The distributed units may be responsible for providing the radio access interface for terminal devices connected to the NR network. Each distributed unit has a coverage area (radio access footprint) which together define the coverage of the communication cell. Each distributed unit includes transceiver circuitry for transmission and reception of wireless signals and processor circuitry configured to control the respective distributed units. In terms of broad top-level functionality, the core network component of such a new RAT telecommunications system may be broadly considered to correspond with the core network 102 represented in FIG. 1, and the respective controlling nodes and their associated distributed units/TRPs may be broadly considered to provide functionality corresponding to base stations of FIG. 1. Thus, the term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. A terminal device operating in this proposed new RAT architecture may thus exchange signalling with a first controlling node via one or more of the distributed units associated with the controlling node. In some implementations the involvement of the distributed units in routing communications from the terminal device to a controlling node (controlling unit) may be transparent to the terminal device. It will further be appreciated that this example represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architecture shown in FIG. 1. It will be appreciated that the specific wireless telecommunications architecture in any given implementation is not of primary significance to the principles described herein.

In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node and/or a TRP in a new RAT architecture of the kind discussed above.

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

Thus a conventional way for a terminal device (UE) in RRC idle mode to exchange data with a network involves the terminal device first performing an RRC connection procedure (random access procedure) with the network. The RRC connection procedure involves the UE initially transmitting a random access request message (which may be triggered autonomously by the UE determining it has data to transmit to the network or in response to the network instructing the UE to connect to the network). This is followed by RRC control message exchange between the network and UE. After establishing an RRC connection and exchanging the relevant data, the UE may then perform RRC disconnection and move back into idle mode for power saving. This conventional approach may for convenience be referred to herein as a legacy approach.

The random access procedure can be relatively inefficient if the amount of data to be communicated with the network is relatively small, for example in terms of signalling overhead and associated UE power usage. There have therefore been proposals for a UE to communicate higher-layer/user plane data with the network during the RRC connection procedure itself. One approach for this is referred to as Early Data Transmission (EDT) and allows the UE to transmit and/or receive data during the Random Access process whilst in idle mode, thereby communicating the relevant data without the need to complete the establishment of an RRC connection, which can be particularly helpful for infrequent and short messages type of traffic.

Figure 2:
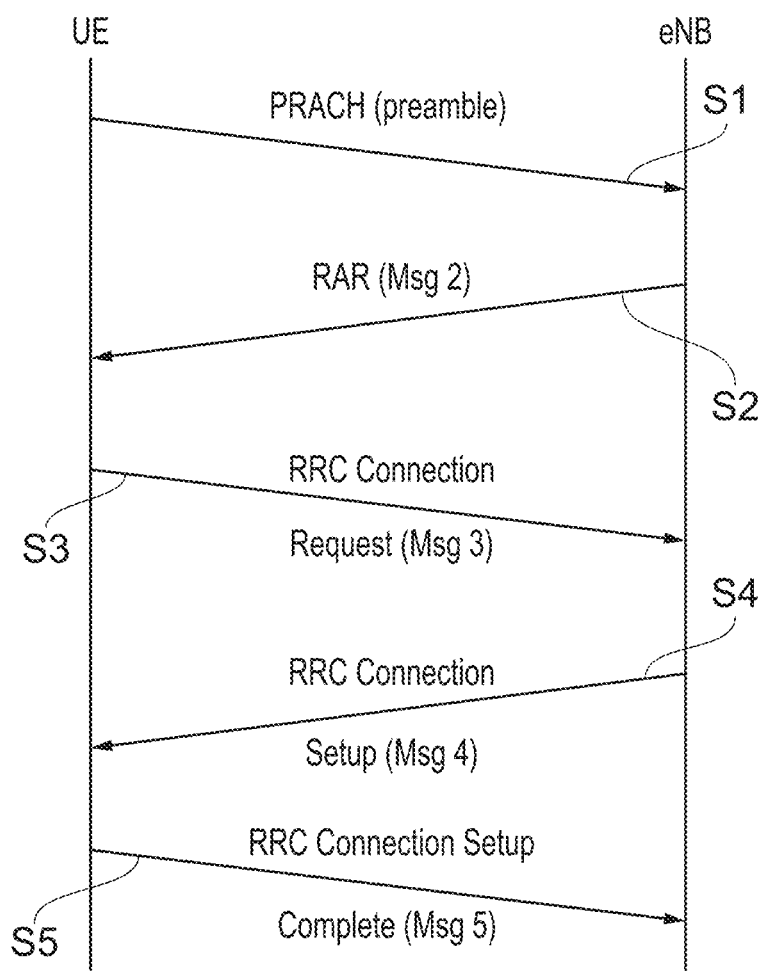
FIG. 2 schematically represents steps in a random access procedure in a wireless telecommunication network.

FIG. 2 is a ladder diagram that schematically shows message exchange between a UE and an eNB in a typical random access procedure to establish an RRC connection, in this example in an LTE-based network. The UE starts the process in step S1 by transmitting a random access request on a physical random access channel (PRACH in an LTE context), i.e. a random access preamble (RACH preamble), to the eNB. In step S2, when the eNB detects this preamble it will respond with a Random Access Response message (RAR), which is also known as Message 2. The RAR is scheduled by DCI (downlink control information) carried on a physical downlink control channel, e.g. MPDCCH in an LTE implementation for machine type communication (MTC) traffic, in a predefined Common Search Space (CSS). The RAR itself is transmitted on a physical downlink shared channel (PDSCH) resource allocated via the DCI. The DCI is addressed to an RA-RNTI (random access radio network temporary identifier) which is derived from the time and frequency resources used to transmit the preamble in step S1 and the RAR will indicate which preamble the eNB has detected and is responding to. It may be noted it is possible that multiple UEs may transmit a random access request using the same PRACH preamble and the same time and frequency resources. The RAR of step S2 also contains an uplink grant for the preamble the network is responding to so that the UE that transmitted the preamble may use this uplink grant to transmit an RRC Connection Request message, also known as Message 3 to the eNB, in step S3. Message 3 also contains an indication of an identifier for the UE (e.g. a C-RNTI (cell radio network temporary identifier) or TMSI (temporary mobile subscriber identity) or a 40-bit random number generated by the UE. The eNB will respond to Message 3, in step S4, with Message 4 which carries a RRC Connection Setup message. For the case where multiple UEs use the same preamble, the combination of Message 3 and Message 4 provides contention resolution functionality, for example using a terminal device identifier, such as C-RNTI or TMSI, transmitted in Message 3: when a UE receives a Message 4 that contains a portion of the Message 3 containing the temporary identity that it transmitted earlier, it knows that there was no contention on the Message 3 that it had transmitted. The RRC connection is established when the UE transmits Message 5 in step S5 containing a RRC Connection Setup Complete message.

A previously proposed approach for EDT in uplink is for additional data to be transmitted in association with the RRC connection request message, in Message 3 (step S3 in FIG. 2). For the legacy approach to random access, Message 3 carries only control messages and therefore has a limited Transport Block Size (TBS). In order for Message 3 to carry more useful amounts of data, the 3GPP group has agreed to allow for an increase in the TBS for Message 3 to 1000 bits. However, it has also been agreed that an eNB need not fulfil an EDT request by allocating resources for a TBS for Message 3 up to 1000 bits, but the eNB can instead schedule a smaller TBS as for a legacy Message 3, for example having regard to overall resource availability. In this case the UE may, for example, need to follow the legacy approach of establishing an RRC connection to communicate the data rather than using EDT.

In order for the eNB to identify whether a UE has EDT capability/is requesting an allocation of radio resources for EDT in Message 3, it has been proposed that a set of available PRACH preambles be partitioned such that a sub-group of PRACH preambles is used by a UE supporting EDT to indicate to the eNB its capability and to request EDT over Message 3. In many scenarios, the amount of data that a UE could transmit within the resources allocated to it for the transmission of the Message 3 may significantly exceed the amount of data which the UE has to transmit. One possibility is for the UE to add padding to the message so that the amount of data it has to send corresponds to the resources which have been allocated to it. Recognising that a single TBS (of, for example, 1000 bits) may lead to a large amount of padding being required in the event that the amount of data to be transmitted by a UE is significantly less than the TBS, and hence inefficient use of resources and unnecessary power consumption by the UE, it has been proposed that a UE which has EDT capability may select a TBS from one of four possible TBS for its EDT message transmission.

However, the inventors of the present application have recognised that there is therefore a need for a UE to determine which resources to use for the transmission of the EDT message. In particular, according to conventional techniques, the communications resources allocated in a conventional Message 2 (step S2 in FIG. 2) reflect the actual TBS to be used by the UE for the transmission of the conventional Message 3 (step S3 in FIG. 2). There is therefore a need for a means by which a UE is able to select an appropriate TBS and, having selected the TBS, to determine the communications resources to be used for the transmission of the EDT message, using the selected IBS.

In order to overcome these disadvantages then, according to certain embodiments of the present technique, the UE determines an amount of data to transmit, determines a set of communications resources which is a subset of communications resources allocated to it, and transmits the amount of data in the determined resources. Because the amount of data which it transmits (which may include some padding) is closer to the amount which it originally had to transmit, the amount of padding which it transmits may be reduced.

Figure 3:
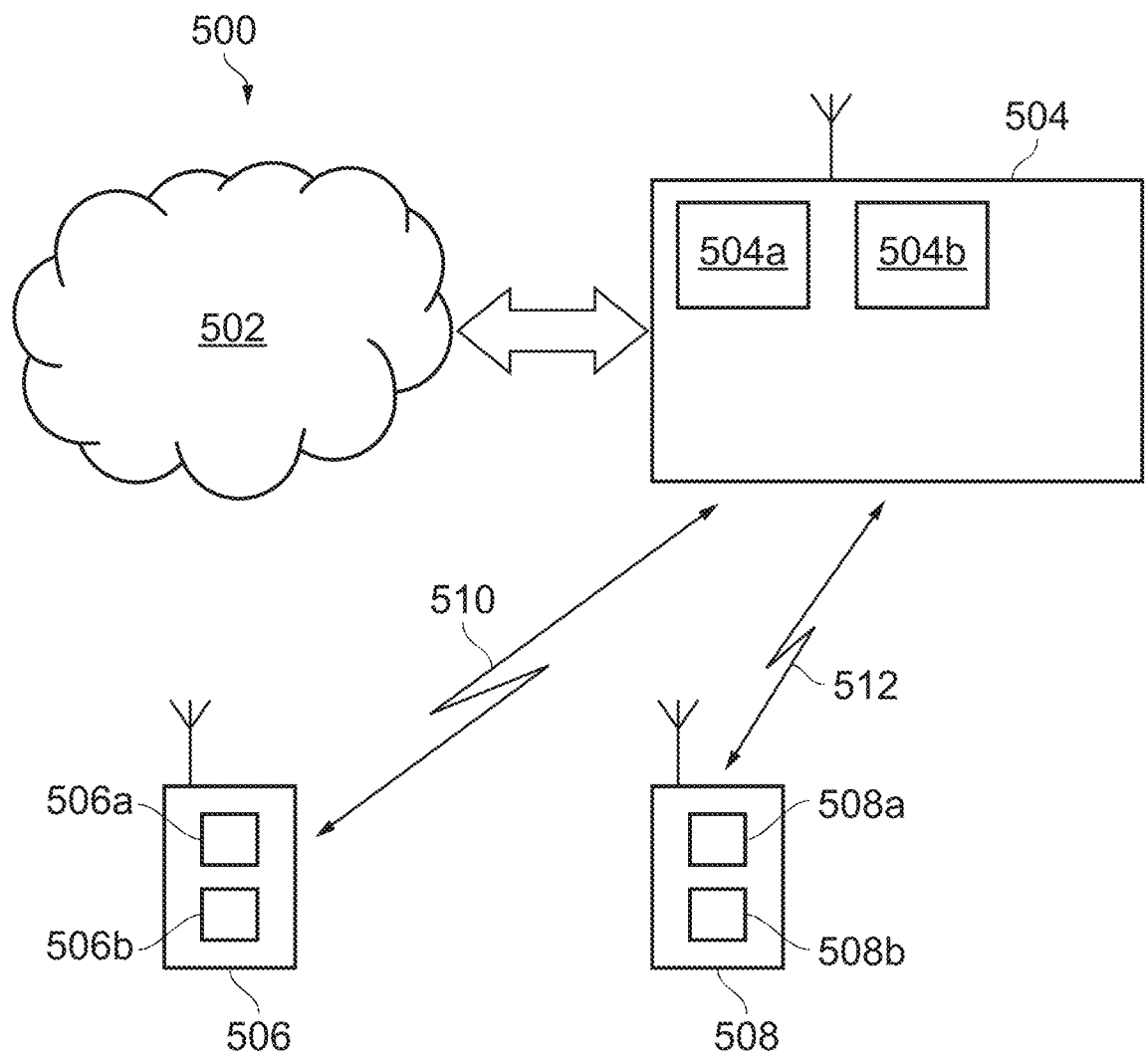
FIG. 3 schematically represents some aspects of a wireless telecommunication system in accordance with certain embodiments of the present disclosure.

FIG. 3 schematically shows a telecommunications system 500 according to an embodiment of the present disclosure. The telecommunications system 500 in this example is based broadly around an LTE-type architecture. As such many aspects of the operation of the telecommunications system/network 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 3 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service (EPS) connections with the terminal devices 506, 508 operating in the communications system based on subscriber information stored in a home subscriber server (HSS). Other network components in the core network (also not shown for simplicity) include a policy charging and resource function (PCRF) and a packet data network gateway (PDN-GW) which provides a connection from the core network part 502 to an external packet data network, for example the Internet. As noted above, the operation of the various elements of the communications system 500 shown in FIG. 3 may be broadly conventional apart from where modified to provide functionality in accordance with embodiments of the present disclosure as discussed herein.

In this example, it is assumed the first terminal device 506 is a conventional smartphone-type terminal device communicating with the base station 504 in a conventional manner (i.e. the first terminal device is a legacy terminal device that does not support EDT). It will be appreciated the first terminal device need not be a smartphone-type terminal device and could equally be another type of legacy terminal device, including a device that has the capability to support EDT, but is currently not doing so. The conventional/legacy terminal device 506 comprises transceiver circuitry 506a (which may also be referred to as a transceiver/transceiver unit) for transmission and reception of wireless signals and processor circuitry 506b (which may also be referred to as a processor/processor unit) configured to control the device 506. The processor circuitry 506b may comprise various sub-units/sub-circuits for providing functionality as explained further herein. These sub-units may be implemented as discrete hardware elements or as appropriately configured functions of the processor circuitry. Thus the processor circuitry 506b may comprise circuitry which is suitably configured/programmed to provide the desired functionality using conventional programming/configuration techniques for equipment in wireless telecommunications systems. The transceiver circuitry 506a and the processor circuitry 506b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). As will be appreciated the legacy (non-EDT) terminal device 506 will in general comprise various other elements associated with its operating functionality.

In this example, it is assumed the second terminal device 508 is a machine-type communication (MTC) terminal device 508 adapted to support EDT (i.e. the second terminal device may be referred to as an EDT terminal device/UE). In this regard, the second terminal device 508 may be a reduced capability terminal device, for example a terminal device able to operate on a restricted bandwidth as compared to conventional terminal devices (i.e. what might be referred to as a narrowband device). However, it will be appreciated this represents merely one specific implementation of approaches in accordance with embodiments of the disclosure, and in other cases, the same principles may be applied in respect of terminal devices that support EDT but which are not reduced capability terminal devices, but may, for example, comprise smartphone terminal devices, or indeed any other form of terminal device, that may be operating in a wireless telecommunications system. It will be appreciated that an EDT terminal device may also function as a non-EDT/legacy terminal device, e.g. when it does not want to use EDT.

The EDT terminal device 508 comprises transceiver circuitry 508a (which may also be referred to as a transceiver/transceiver unit) for transmission and reception of wireless signals and processor circuitry 508b (which may also be referred to as a processor/processor unit) configured to control the terminal device 508. The processor circuitry 508b may comprise various sub-units/sub-circuits for providing desired functionality as explained further herein. These sub-units may be implemented as discrete hardware elements or as appropriately configured functions of the processor circuitry. Thus the processor circuitry 508b may comprise circuitry which is suitably configured/programmed to provide the desired functionality described herein using conventional programming/configuration techniques for equipment in wireless telecommunications systems. The transceiver circuitry 508a and the processor circuitry 508b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 508 will in general comprise various other elements associated with its operating functionality, for example a power source, user interface, and so forth, but these are not shown in FIG. 3 in the interests of simplicity.

The base station 504 comprises transceiver circuitry 504a (which may also be referred to as a transceiver/transceiver unit) for transmission and reception of wireless signals and processor circuitry 504b (which may also be referred to as a processor/processor unit) configured to control the base station 504 to operate in accordance with embodiments of the present disclosure as described herein. The processor circuitry 504b may comprise various sub-units/sub-circuits for providing desired functionality as explained further herein. These sub-units may be implemented as discrete hardware elements or as appropriately configured functions of the processor circuitry. Thus the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 3 as separate elements for ease of representation. However, it will be appreciated that the functionality of these circuitry elements can be provided in various different ways, for example using one or more suitably programmed programmable computer (s), or one or more suitably configured application-specific integrated circuit(s)/circuitry/chip(s)/chipset(s). It will be appreciated the base station 504 will in general comprise various other elements associated with its operating functionality.

Thus, the base station 504 is configured to communicate data with both the legacy terminal device 506 and the EDT terminal device 508 according to an embodiment of the disclosure over respective communication links 510, 512. The base station 504 is configured to communicate with the legacy terminal device 506 over the associated radio communication link 510 and with the EDT UE 508 over the associated radio communication link 512 generally following the established principles of LTE-based communications, apart from using modified random access procedures in accordance with certain embodiments of the present disclosure as described herein.

Communications resources allocated, for example by the base station 101 for a transmission by the terminal device 104, may comprise one or more time periods and one or more frequency ranges, within which signals making up the transmission may be transmitted. In particular, the allocated communications resources may comprise one or more physical resource blocks (PRBs), each physical resource block comprising a predetermined number (e.g., 12) of orthogonal frequency division multiplexing (OFDM) subcarriers for a predetermined time period (e.g. one subframe, or 1 millisecond). The actual transmission scheme used by the terminal device 104 may be based on single-carrier frequency division multiplexing (SC-FDMA). In SC-FDMA, a precoding step may be applied to resource elements before mapping to subcarriers and modulation. SC-FDMA is an example of an orthogonal frequency division multiplexing (OFDM) scheme.

Depending on the nature of the wireless access interface, the allocated communications resources may be further associated with (or in other words, may be said to comprise) a transmission power. The transmission power may be indicated by the base station 101 for each corresponding allocation of communications resources (for example, together with or as part of an indication of the time periods and/or frequency ranges), or may be determined by the terminal device 104 in accordance with a predetermined algorithm or equation. The predetermined algorithm or equation may be in accordance with any appropriate power control techniques.

In order for a receiver (such as the base station 101) to be able to decode the signals it may be necessary that a modulation and coding scheme used for the transmission of the signals is known to both the transmitter and the receiver. As such, the allocation of communications resources may be associated with the modulation and coding scheme that the transmitter is to use when transmitting signals in the allocated communications resources and according to which, the receiver will attempt to decode the received signals.

In order to improve a likelihood of a correct decoding, a transmission may be associated with a number of repetitions. A number of repetitions which is associated with allocated communications resources is referred to herein as Rmax.

The number of repetitions Rmax indicates a number of times that a data transmission may be repeated, for example in terms of a number of subframes in which the data transmission may be repeated. A higher number of repetitions increases a probability that the data will be successfully received. A higher number of repetitions may be used if, for example, transmissions from the terminal device 104 are received by the base station 101 with a low signal power or a low signal to noise and interference ratio, for example, where the terminal device 104 is at an edge of the coverage area of the cell 103.

Conventional techniques for performing repetitions on a packet uplink shared channel (PUSCH) are described in section 8 of 3GPP TS 36.213 [6].

It will be readily apparent that an amount of data that can be transmitted in a transport block (i.e. the transport block size, TBS) depends on the extent of the allocated communications resources and the modulation and coding scheme with which the data is to be transmitted.

In some embodiments of the present technique, the TBS for the message 3 is increased in accordance with an early data transmission (EDT) procedure so that, instead of an RRC Connection Request message, the message 3 may contain useful data (e.g. data having an ultimate destination beyond the base station 101, or data having an ultimate destination at a protocol layer above an access stratum layer or RRC entity of the base station 101). The useful data may be data generated by an application running on the processor of the terminal device 104.

In some embodiments of the present technique, the base station 101 allocates resources for the transmission of the message 3, without being aware of the amount of data which the terminal device 104 intends to transmit. The amount of resources allocated may correspond to a maximum TBS value; in other words, the maximum TBS value refers to the maximum amount of data which can be transmitted in the allocated resources.

Figure 4:
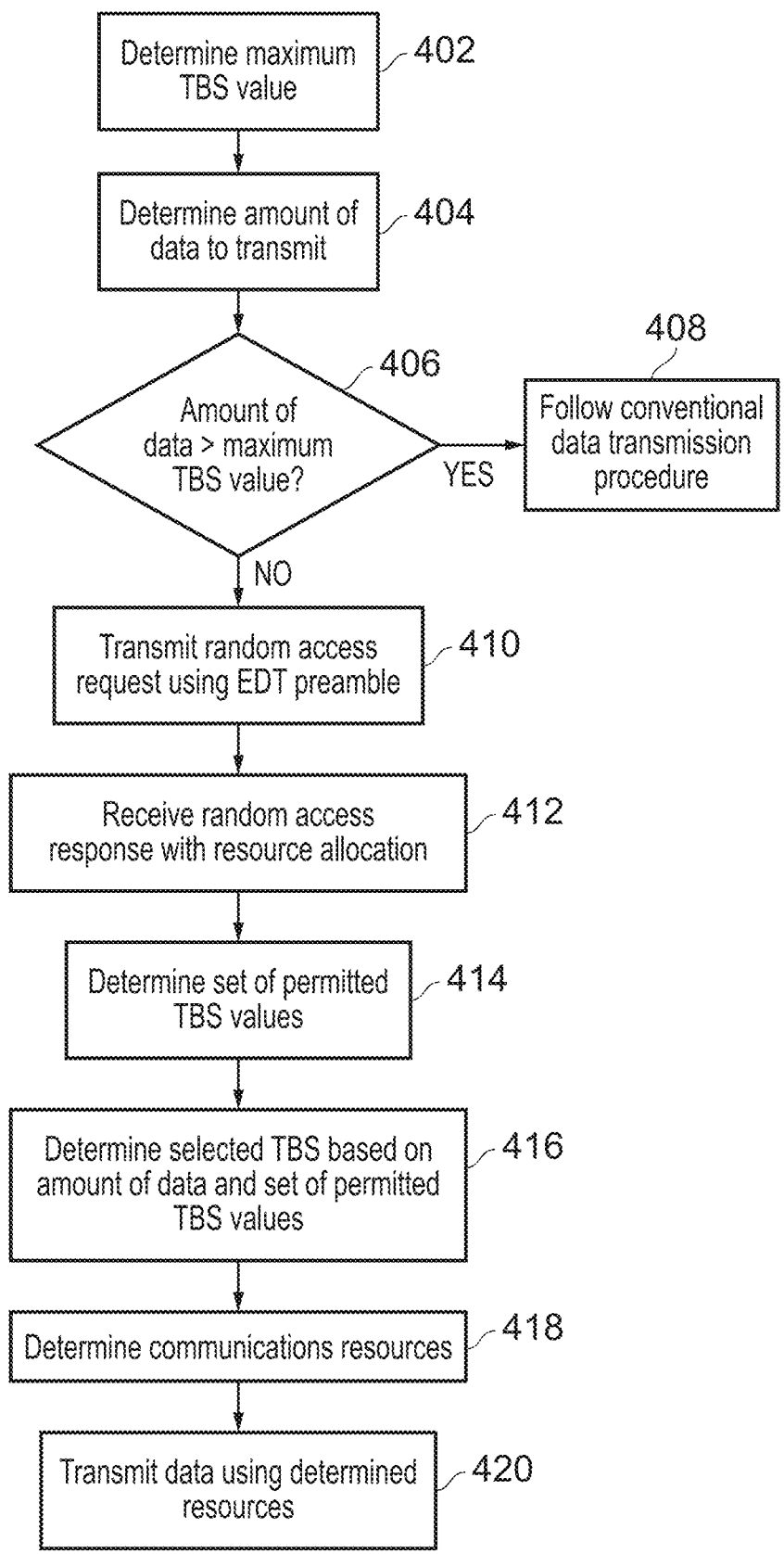
FIG. 4 is a flow diagram representing a process which may be carried out by a terminal device in accordance with example embodiments of the present technique.
Figure 5:
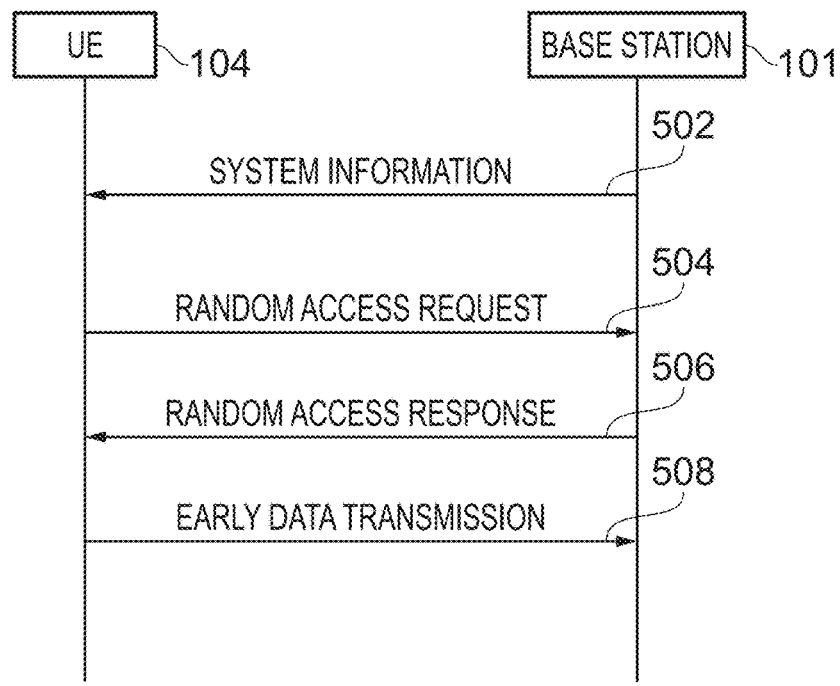
FIG. 5 is a message sequence chart illustrating a sequence of transmissions in accordance with example embodiments of the present technique.

FIG. 4 is a flow diagram representing a process which may be carried out by a terminal device, such as the terminal device 104, in accordance with example embodiments of the present technique. The process illustrated in FIG. 4 will be explained with reference to FIG. 5, which is a message sequence chart illustrating a sequence of transmissions in accordance with example embodiments of the present technique.

The process starts at step 402, in which the terminal device 104 determines the maximum TBS value.

The maximum TBS value may be pre-determined and thus known to both the terminal device 104 and the base station 101. For example, an indication of the maximum TBS value may be transmitted in a broadcast system information message 502, sent by the base station 101 and received by the terminal device 104. In some embodiments, the maximum TBS value may be standardised, and thus may be pre-configured within the terminal device 104 and the base station 101.

In step 404, the terminal device 104 determines an amount of data which it is to transmit. For example, an access stratum protocol entity in the terminal device 104 may receive from an upper layer (such as a non-access stratum protocol entity) an indication of the amount of data, or the data directly.

In step 406, the terminal device 104 determines whether or not the amount of data to be transmitted exceeds the maximum TBS value. If it does, then the EDT procedure may be unsuitable, since, according to agreed principles of the EDT procedure, communications resources will only be allocated for the transmission of an amount of data corresponding to the maximum TBS value, and so it will not be possible to complete the transmission of the data within the resources allocated during the EDT procedure. In such a case, control passes to step 408 and a conventional technique (e.g. a request for an establishment of an RRC connection and a subsequent transmission of the data by means of the RRC connection) are used to transmit the data.

If, on the other hand, the amount of data to be transmitted does not exceed the amount which can be transmitted within an allocation of resources corresponding to the maximum TBS value, then control passes to step 410.

In step 410, the terminal device 410 initiates the EDT procedure by transmitting on the random access channel a random access request 504, which may be substantially the same as the random access request described above in respect of step S1 in FIG. 2. However, according to some embodiments, the terminal device 410 may indicate to the base station 101 that the random access request 504 forms part of an EDT procedure by means of a RACH preamble reserved for such purpose.

In step 412, the terminal device 412 receives a random access response 506, transmitted by the base station 101 in response to the random access request 504. The random access response 506 may comprise an indication of allocated resources, sufficient for transmitting an amount of data corresponding to the maximum TBS value. The allocated resources may be on a packet uplink shared channel (PUSCH).

In step 414, the terminal device 104 determines a set of permitted TBS values. The set of permitted TBS values comprises those TBS values with which the terminal device 104 may transmit the data. The set of permitted TBS values may include the maximum TBS value and zero or more additional TBS values. Each of the set of permitted TBS values may be no greater than the maximum TBS value. The set of permitted TBS values may consist of no more than four TBS values, including the maximum TBS value.

The determination of the set of permitted TBS values may be according to one of the example techniques described in more detail below.

Based on the set of permitted TBS values and the amount of data to be transmitted, the terminal device 104 selects, in step 416, a selected TBS. The selected TBS may be one of the set of permitted TBS values. The selected TBS may be the smallest of the set of permitted IBS values, which is not smaller than the amount of data to be transmitted.

For example, in a scenario, the terminal device 104 may have 350 bits to transmit. At steps 402 and 414, the terminal device 104 may have respectively determined that the maximum IBS value is 1000 bits, and that the set of permitted IBS values is the set of {100 bits, 400 bits, 800 bits, 1000 bits}. At step 416, the terminal device 104 may select, as the selected TBS, 400 bits, that being the smallest of the set of permitted TBS values which is not smaller than the amount of data it is to transmit.

As described above, at step 412 the terminal device receives in the random access response 506 an indication of an allocation of communications resources which are suitable for transmitting the amount of data corresponding to the maximum TBS value. However, in accordance with embodiments of the present disclosure, the terminal device, at step 418, determines a set of communications resources to be used for the transmission of the data, based on the allocated communications resources.

In some embodiments, if the TBS selected in step 416 is equal to the maximum TBS value, the terminal device 416 may select communications resources which are the same as those allocated by the base station 101.

If the selected TBS, selected in step 416, is smaller than the maximum TBS value, the terminal device 416 may select (i.e., determine) communications resources which are less than those allocated by the base station 101.

In some embodiments of the present technique, the selected communications resources may comprise a reduced transmission power, that is, the determined communications resources may comprise a transmission power lower than that associated with the allocated communications resources. Where the allocated communications resources comprise a time period or frequency range, these may be reduced in the selected communications resources, so that the selected communications resources comprise only a subset of the allocated communications resources.

The selected communications resources may be determined according to example techniques described further below.

In step 420, the terminal device 104 transmits the data 508, using the selected TBS and the selected communications resources. In some embodiments, where the amount of data to be transmitted is less than the selected TBS, padding bits may be added to the data prior to transmission.

However, it will be appreciated that the amount of padding which may be required where the selected TBS is lower than the maximum TBS value, may, in accordance with embodiments of the present technique, be substantially reduced, compared with a conventional technique in which sufficient padding is added to the data so that the total transmission (of data and padding) corresponds to the maximum TBS value.

In some embodiments of the present technique, the order of the steps illustrated in FIG. 4 may be different from those described above, and some of the steps may be omitted. For example, where the amount of data to be transmitted is equal to the maximum TBS value, steps 414 and 416 may be omitted and the communications resources determined in step 418 may be those indicated in the resource allocation received at step 412. Some of the steps may be modified in accordance with one or more of the examples described below.

In some embodiments of the present technique, the infrastructure equipment transmits to the terminal device an indication of the maximum TBS value. The indication of the maximum TBS value may be in the form of an index to a table of maximum TBS values.

In some embodiments, the infrastructure equipment may alternatively or additionally transmit an indication of the set of permitted IBS values. In some embodiments, the set of permitted TBS values may be determined directly from the maximum TBS value. For example, the table of the maximum TBS values may further comprise, for each index value, the maximum TBS value and the set of permitted TBS values. The terminal device 104, having received an index to the table of maximum TBS values, may thus determine both the maximum TBS value and the set of permitted TBS values.

An example of the table is shown in Table 1 below, in which the columns TBS #1, TBS #2, TBS #3 and TBS #4 provide the constituent IBS values of the respective set of permitted IBS values

TABLE 1

| Index | Max TBS (bits) | TBS#1 | TBS#2 | TBS#3 | TBS#4 |
|---|---|---|---|---|---|
| 1 | 1000 | 1000 bits | 800 bits | 600 bits | 300 bits |
| 2 | 1000 | 1000 bits | 700 bits | 500 bits | 250 bits |
| 3 | 800 | 800 bits | 600 bits | 400 bits | 250 bits |
| 4 | 700 | 700 bits | 500 bits | 300 bits | 200 bits |
| 5 | 600 | 600 bits | 500 bits | 300 bits | 200 bits |
| 6 | 500 | 500 bits | 400 bits | 300 bits | 100 bits |
| 7 | 400 | 400 bits | 300 bits | 200 bits | 100 bits |
| 8 | 300 | 300 bits | 200 bits | 100 bits | N/A |

The table may be pre-configured in the terminal device 104 (e.g. because the table is standardised for all terminal devices).

In some embodiments, the number of TBS values in the set of permitted TBS values is the same for each value of the maximum TBS value. In some other embodiments, the number of IBS values in the set of permitted TBS values may vary, depending on the index value and/or the maximum TBS value. For example, in Table 1 above, the set of permitted TBS values indicated by each of the index values 1 to 7 consists of four different permitted TBS values, while the set of permitted TBS values indicated by index value 8 has only three permitted TBS values.

As an example, if at step 402 of FIG. 4, the terminal device has stored or is preconfigured with Table 1, and receives from the base station 101 an indication of index value 4 (for example, in broadcast system information 502), then at step 402 it determines that the maximum TBS value is 700 bits. Subsequently at step 414, the terminal device determines, based on the received index value 4, that the set of permitted TBS values is the set {700 bits, 500 bits, 300 bits, 200 bits}.

In some embodiments of the present technique, each of the table indices are associated with different maximum TBS values; however, as shown in the example in Table 1 above (see index values 1 and 2), in some embodiments, multiple index values may indicate the same maximum TBS value.

In some embodiments of the present technique, an indication of the set of permitted TBS values is included in the random access response 506, received by the terminal device 104 at step 412.

The inventors of the present disclosure have appreciated that various fields within the conventional message 2 (e.g. when allocating resources for a Message 3 other than as part of an EDT procedure) may not be essential in the context of EDT and may therefore be used for alternative purposes. For example, in the conventional message 2 format, one or more bits may be used to indicate the IBS to be used by the terminal device 104. Since, in an EDT procedure, the selected TBS is determined by the terminal device 104, those bits may be used in accordance with embodiments of the present technique to indicate one or more of the set of permitted TBS values, TBS scaling factors, TBS Index offsets, repetition scaling factors, DTX patterns, and a power reduction, as will be described below.

For example, two bits of a conventional TBS field used in an uplink grant portion of the message 2 formatted according to a particular mode of operation (for example, an uplink coverage extension (CE) mode B, which may correspond to one or more predetermined RACH CE levels) may comprise, in accordance with embodiments of the present technique, an index to a table of sets of permitted TBS values which may be defined in a suitable specification. As such, the terminal device 104 may determine the set of permitted TBS values based on an indication in the message 2.

In some embodiments of the present technique, the set of permitted 113S values may be specified in absolute terms, for example, in a table having the form of Table 2.

TABLE 2

| TBS Field | Indicated TBS |
|---|---|
| 00 | 1000, 900, 800, 700 |
| 01 | 1000, 750, 500, 250 |
| 10 | 1000, 600, 500, 400 |
| 11 | 1000, 600, 300, 100 |

In some embodiments, the set of permitted TBS values includes, in addition to the maximum TBS value, only those indicated TBS which are not larger than the maximum TBS value. For example, using the values in Table 2, if the maximum TBS value is determined in step 402 to be 800 bits, and the TBS field indicates '10', then the set of permitted TBS values is the set {800 bits, 600 bits, 500 bits, 400 bits}.

In other embodiments, a field within the message 2 indicates one or more TBS scaling factors, each being less than or equal to 1. The set of permitted TBS values is obtained by multiplying the maximum IBS value with each of the TBS scaling factors. An example of a table providing TBS scaling factors associated with each of a plurality of index values is shown in Table 3:

TABLE 3

| TBS Field | TBS scaling factors |
|---|---|
| 00 | 1, 0.9, 0.8, 0.7 |
| 01 | 1, 0.75, 0.5, 0.25 |
| 10 | 1, 0.6, 0.5, 0.4 |
| 11 | 1, 0.6, 0.3, 0.1 |

For example, where the maximum TBS value is 1000 bits, and the TBS field is '01', the terminal device at step 414 determines that the set of permitted TBS values is {1000 bits, 750 bits, 500 bits, 250 bits}, by multiplying the maximum TBS value determined at step 402 by each of the TBS scaling factors indicated in the random access response 506 at step 412.

In some embodiments, a TBS scaling factor of '1' (i.e. corresponding to no reduction in TBS) is implicit, such that the set of permitted TBS values in any case includes the maximum TBS value. In some embodiments, where the multiplication results in a TBS value which is not preferred, the result of the multiplication may be suitably rounded, for example, by rounding down to the nearest lower integer or to a nearest TBS in a predetermined set of allowed TBS values. The predetermined set of allowed or preferred TBS values may be, for example, specified in suitable specifications.

According to conventional techniques, a TBS may be determined by means of a pre-determined lookup table of TBS values, from which the terminal device 104 can determine the TBS (in bits) by reference to a TBS index, the TBS index referencing an entry in the pre-determined lookup table of TBS values. Examples of such a pre-determined lookup table of TBS values may be found in 3GPP TS 36.213 [6], section 7.1.7.

In some embodiments of the present technique, the set of permitted TBS values is determined by determining an index to an entry in a pre-determined lookup table of TBS values associated with the maximum TBS value, and applying one or more TBS index offsets to the index associated with the maximum TBS value, to obtain a set of permitted TBS values indices. The set of permitted TBS values is thus determined based on the set of permitted TBS indices, by reference to a table entry in the pre-determined lookup table of TBS values corresponding to each respective one of the set of permitted TBS indices. The pre-determined lookup table of TBS values may be a conventional table of TBS values (such as described above), or may be specified for the use in determining the set of permitted TBS values.

The one or more TBS index offsets may be indicated in the message 2; for example, using the TBS field as described above. An example of a table by which the TBS index offsets may be indicated using the TBS field is shown in Table 4.

TABLE 4

| TBS Field | TBS Index Offset |
|---|---|
| 00 | {0, 1, 2, 3} |
| 01 | {0, 1, 3, 4} |
| 10 | {0, 2, 4, 6} |
| 11 | {0, 2, 4, 8} |

The allocation of communications resources, such as that received at step 412 of FIG. 4, may be associated with a number of repetitions Rmax; for example, the number of repetitions may be indicated along with the indication of the allocation of communications resources in the message 2. Alternatively, the number of repetitions associated with the allocated resources may be predetermined (e.g. standardised).

In some embodiments of the present technique, if the number of repetitions associated with the allocated communications resources is greater than one, the step of determining communications resources (such as step 418 of FIG. 4) may comprise determining a number of repetitions, R.

The inventors of the present disclosure have recognised that, where the selected TBS is smaller than the maximum TBS value, fewer repetitions may be required in order to achieve the same probability of successful reception and decoding as would be achieved when transmitting the maximum TBS value using the allocated communications resources and using the number of repetitions associated with the allocated communications resources Rmax. Accordingly, in some embodiments of the present technique, if the number of repetitions associated with the allocated resources, Rmax, is greater than one, and the selected TBS is smaller than the maximum TBS value, then the number of repetitions R is reduced, compared with the number associated with the allocated communications resources Rmax. This reduction may reduce the power consumption for the terminal device 104 in transmitting the data.

In some embodiments of the present technique, the number of repetitions R determined by the terminal device 104 for the transmission of the data is determined based on the selected TBS. For example, in some embodiments, the terminal device may be configured with a table in which, for each selected TBS value, there is associated at least one of a corresponding number of repetitions and a factor by which the number of repetitions associated with the allocated resources Rmax is to be reduced, in order to determine the determined number of repetitions R.

In some embodiments, the number of repetitions R is determined based on the number of repetitions associated with the allocated communications resources Rmax, the selected TBS value and the maximum TBS value. For example, the terminal device may determine the number of repetitions in accordance with a table, such as a table having the form of Table 5.

TABLE 5

| Max TBS (bits) | TBS#1 | TBS#2 | TBS#3 | TBS#4 |
|---|---|---|---|---|
| 1000 | 1000 bits $R = R_{max}$ | 800 bits $R = 4 \times R_{max}/5$ | 600 bits $R = R_{max}/2$ | 300 bits $R = R_{max}/4$ |
| 1000 | 1000 bits $R = R_{max}$ | 700 bits $R = 4 \times R_{max}/5$ | 500 bits $R = R_{max}/2$ | 250 bits $R = R_{max}/4$ |
| 800 | 800 bits $R = R_{max}$ | 600 bits $R = 3 \times R_{max}/4$ | 400 bits $R = R_{max}/2$ | 250 bits $R = R_{max}/4$ |
| 700 | 700 bits $R = R_{max}$ | 500 bits $R = 5 \times R_{max}/7$ | 300 bits $R = R_{max}/2$ | 200 bits $R = R_{max}/4$ |
| 600 | 600 bits $R = R_{max}$ | 500 bits $R = 5 \times R_{max}/6$ | 300 bits $R = R_{max}/2$ | 200 bits $R = R_{max}/4$ |
| 500 | 500 bits $R = R_{max}$ | 400 bits $R = 4 \times R_{max}/5$ | 300 bits $R = 3 \times R_{max}/5$ | 100 bits $R = R_{max}/5$ |
| 400 | 400 bits $R = R_{max}$ | 300 bits $R = 3 \times R_{max}/4$ | 200 bits $R = R_{max}/2$ | 100 bits $R = R_{max}/1$ |
| 300 | 300 bits $R = R_{max}$ | 200 bits $R = 2 \times R_{max}/3$ | 100 bits $R = R_{max}/3$ | N/A |

As an example, if the maximum TBS value is 600 bits, and the selected TBS is 500 bits, then the number of repetitions R is determined by the equation:

$$R = 5 \times R\text{max}/6$$

If the number of repetitions associated with the allocated communications resources Rmax is, for example, 1024, then the determined number of repetitions R is 853 (rounding down). Further rounding may occur to one of a preconfigured set of preferred repetition values. In the example, therefore, further rounding to e.g. R=768 repetitions may occur.

In some embodiments, an indication of the number of repetitions is transmitted by the base station 101 together with the set of permitted TBS values. For example, the message 2 may include an indication of the number of repetitions.

In some embodiments of the present technique, the number of repetitions is indicated using the same bits in the message 2 that are used to indicate the set of permitted TBS values.

For example, Table 2 above may be adapted to include also the number of repetitions, or a repetition scaling factor to be used in determining the number of repetitions, as illustrated in Table 6 below.

TABLE 6

| TBS Field | Indicated TBS | Repetition scaling factor |
|---|---|---|
| 00 | 1000, 900, 800, 700 | 1, 0.9, 0.8, 0.7 |
| 01 | 1000, 750, 500, 250 | 1, 0.75, 0.5, 0.25 |
| 10 | 1000, 600, 500, 400 | 1, 0.75, 0.5, 0.5 |
| 11 | 1000, 600, 300, 100 | 1, 0.75, 0.5, 0.2 |

The terminal device 104 may determine the number of repetitions to be used for transmitting the data R by determining the number of repetitions associated with the allocated communications resources Rmax, determining the selected TBS, determining the repetition scaling factor corresponding to the selected TBS, and multiplying the number of repetitions associated with the allocated communications resources, Rmax, by the repetition scaling factor corresponding to the selected 113S.

The terminal device 104 may apply rounding to the resulting repetition number R; for example, to round it down to the nearest lower integer.

In some embodiments, Table 4 may be modified to include repetition scaling factors, so that the TBS field may indicate a set of IBS Index Offsets, and corresponding repetition scaling factors.

In some embodiments of the present technique, when the determined repetition number R is greater than one then, at step 420, the terminal device 104 repeats the transmission of the data with a constant periodicity at a maximum permitted rate, for example every subframe, until it has completed the determined number of repetitions.

In other embodiments of the present technique, when the determined repetition number R is greater than one and is less than the number of repetitions associated with the allocated communications resources, Rmax, then the terminal device 104 determines a discontinuous transmission, DTX, pattern, with which it is to transmit the data. The DTX pattern is determined such that the number of repetitions of the transmission is equal to the determined repetition number and the total transmission duration (i.e. the time from starting the transmission of the data, until the completion of the last transmission) is not greater than the time period allocated by the base station 101 for the transmission of an amount of data corresponding to the maximum TBS value using Rmax repetitions.

The DTX pattern may be characterised by a transmission time (a duration for which the data is repeatedly transmitted at the maximum permitted rate), a periodicity (a duration between the start of consecutive transmission times, in other words the transmission time plus an 'off' time) and a total transmission duration (the sum of all transmission times and off times).

Figure 6A:
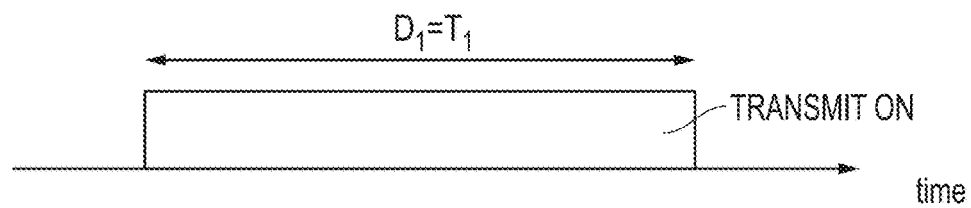
FIGS. 6A, 6B and 6C illustrate different discontinuous transmission schemes which may be applied in accordance with example embodiments of the present technique.
Figure 6B:
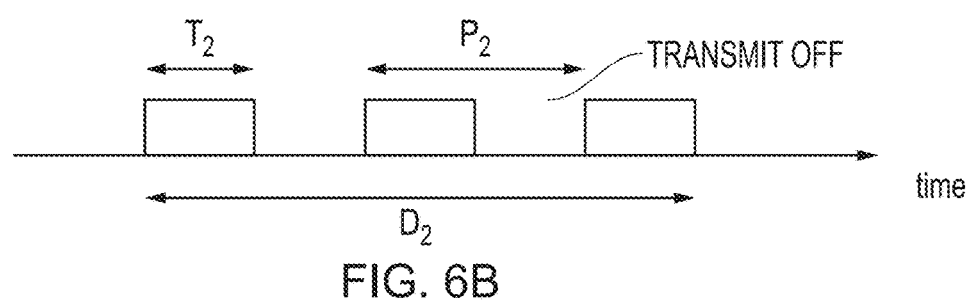
Figure 6C:
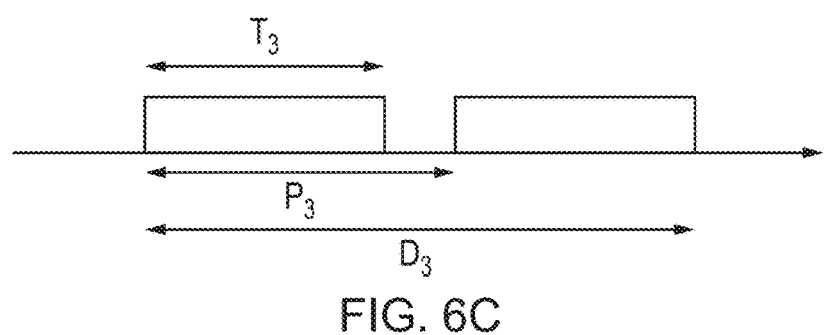

FIGS. 6A, 6B and 6C illustrate examples of possible DTX patterns, having different transmission 'on' times {T1, T2, T3} separated by respective 'off' times, periodicity {P1, P2, P3} and total transmission duration (i.e. the sum of 'on' and 'off' times) {D1, D2, D3}.

In some embodiments of the present technique, during an off time, the terminal device 104 may receive an indication transmitted by the base station 101 that the data has been correctly received. In response to receiving such an indication, the terminal device 104 may thus terminate its transmissions, thereby reducing its power consumption and reducing the total interference generated in the wireless telecommunications network.

The use of a DTX pattern may further improve the probability of a successful reception of the data, as a result of a greater time diversity which applies to transmissions sent according to a DTX pattern compared with the same number of transmissions sent continuously (i.e. without intermediate 'off' periods).

In some embodiments, therefore, the terminal device 104 may, for example at step 418 in FIG. 4, determine a DTX pattern to be used for the transmission of the data. If the selected TBS is equal to the maximum TBS value, then a DTX pattern comprising no off time may be selected (for example, corresponding to the DTX pattern shown in FIG. 6A, in which T1=DD.

In some embodiments, each TBS in the set of permitted TBS values or each TBS scaling factor is associated with a DTX pattern. For example, where the selected TBS scaling factor is 0.5, the DTX pattern may be selected to be a pre-configured DTX pattern having a periodicity equal to twice the transmission time. In general, the terminal device 104 may select a DTX pattern in which the proportion of the total transmission time D which is made up of on time is substantially equal to the IBS scaling factor (or the ratio of the selected TBS value to the maximum TBS value, if it is not determined by reference to a TBS scaling factor; for example, in the DTX pattern illustrated in FIG. 6B, the three on time durations collectively make up approximately 0.6 of the total transmission time D2. The terminal device 104 may select the DTX pattern of FIG. 6B if the selected TBS value is 0.6 times the maximum TBS value Alternatively, each repetition scaling factor may be associated with a DTX pattern.

An indication one or more of DTX patterns may be transmitted by the base station 101 to the terminal device 104. For example, the TBS field in the message 2 may indicate one or more DTX patterns which may be used. In some embodiments, the indication of the DTX pattern(s) may be in addition to one or more of the indication of the set of permitted TBS values, the set of TBS scaling factors, and the repetition number scaling factors.

Accordingly, at step 420, the terminal device 104 may transmit the data using the determined DTX pattern.

As described above, in some embodiments of the present technique, the determined number of repetitions R is lower than that associated with the allocated communications resources, Rmax. However, in some scenarios, the repetition number associated with the allocated communications resources, Rmax is equal to one (i.e. no repetition beyond the initial transmission). This situation may arise, for example, where the terminal device 104 is operating in a CE Mode A and is in good radio conditions.

In some embodiments of the present technique, the determined communications resources by the terminal device 104 at step 418 comprise a reduction in transmission power, compared with the transmission power to be used by the terminal device 104 if the selected TBS is equal to the maximum TBS value.

The terminal device 104 may, for example, determine at step 418 that the repetition number associated with the allocated communications resources, Rmax, is equal to one and that the selected TBS is lower than the maximum TBS value and, based on this determination, may determine a reduced transmission power. The reduced transmission power level may be selected based on the selected TBS or the TBS scaling factor.

The reduced transmission power level may be determined by means of a lookup table or by means of a predetermined function of the selected TBS or the TBS scaling factor. The reduced transmission power level may be determined directly, or by means of an offset to the transmission power level with which the terminal device 104 would transmit, in accordance with the allocated communications resources, if the selected TBS is equal to the maximum TBS value.

In some embodiments of the present technique, the one or more bits of the message 2, which may be conventionally used to indicate to the terminal device 104 when it is in the CE Mode A which MCS (and hence, the TBS) is to be used by the terminal device 104 in its subsequent transmission of the Message 3, are used to indicate the set of permitted TBS values and, for each of the set of permitted TBS values, the corresponding transmission power reduction.

For example, one or more of the bits of the message 2 which conventionally (e.g. when allocating resources for a Message 3 other than as part of an EDT procedure) contain an MCS field can indicate an index to a table containing either absolute values of the set of permitted TBS values or scaling factors that the terminal device 104 uses to determine the set of permitted TBS values (by applying the TBS scaling factors to the previously determined maximum TBS value). For example, two of the MCS field bits may comprise an index to a lookup table of the form illustrated in Table 7, which provides TBS scaling factors and respective transmission power reduction values for four possible combinations of bit settings for two bits of the MCS field.

TABLE 7

| MCS Field bits | TBS scaling factors | Transmission power reduction (dB) |
|---|---|---|
| 00 | 1, 0.9, 0.8, 0.7 | 0, 0.5, 1.0, 1.5 |
| 01 | 1, 0.75, 0.5, 0.25 | 0, 1.2, 3.0, 6.0 |
| 10 | 1, 0.6, 0.5, 0.4 | 0, 2.2, 3.0, 4.0 |
| 11 | 1, 0.6, 0.3, 0.1 | 0, 2.2, 5.2, 10.0 |

The terminal device 104 may therefore determine, based on one or more bits within the message 2 and by means of a lookup table (for example, of the form of Table 7), the set of permitted TBS values and corresponding transmission power reduction amounts.

In some embodiments of the present technique, the determined communications resources by the terminal device 104 at step 418 comprise a reduction in the number of PRBs, compared with a number of PRBs in the allocated communications resources to be used by the terminal device 104 if the selected TBS is equal to the maximum TBS value.

The terminal device 104 may, for example, determine at step 418 that the repetition number associated with the allocated communications resources, Rmax, is equal to one and that the selected TBS is lower than the maximum TBS value and, based on this determination, may determine a reduced number of PRBs.

In yet another embodiment of the present technique, if the terminal device 104 is capable of transmitting using only a subset of subcarriers within a PRB (for example, if the terminal device 104 is 'sub-PRB'-capable), and the allocated communications resources consist of a single PRB within each of a plurality of subframes, the terminal device may in response select, as the determined communications resources, a subset of the subcarriers within the allocated PRBs; for example, the determined communications resources may comprise 3 subcarriers in each of the allocated subframes, instead of 12.

The determination to use only a subset of the subcarriers may be further conditional on the repetition number associated with the allocated communications resources, Rmax, being equal to one.

If the determined communications resources comprise fewer than all of the subcarriers in the allocated PRBs, then according to some embodiments, the number of subcarriers and which subcarriers to use may depend on the selected TBS.

In some embodiments of the present technique, the number of subcarriers in each allocated PRB, and which subcarriers within each allocated PRB which make up the determined communications resources are indicated using one or more of the bits conventionally used for indicating the MCS in the uplink grant portion of the message 2.

The determination of communications resources (e.g. step 418 of FIG. 4) may comprise a comparison of the repetition number associated with the allocated communications resources, Rmax against one or more predetermined thresholds, and the manner in which allocated communications resources are modified or adjusted may be determined based on the outcome of the comparisons.

For example, where the repetition number associated with the allocated communications resources, Rmax exceeds a first threshold (e.g. 400), then the determined repetition number R may be calculated and a DTX pattern applied based on the selected TBS value.

If the repetition number associated with the allocated communications resources, Rmax exceeds a second threshold (e.g. 5), but does not exceed the first threshold, then only a transmission power reduction may be applied based on the selected TBS value.

If the repetition number associated with the allocated communications resources, Rmax does not exceed the second threshold then the determined repetition number R may be set to one, and one or more of the techniques described above for the case where the repetition number associated with the allocated communications resources, Rmax, is equal to one may be applied.

However, the present disclosure is not limited to any particular combination of the techniques described herein, nor of the number or value of predetermined thresholds.

Figure 7:
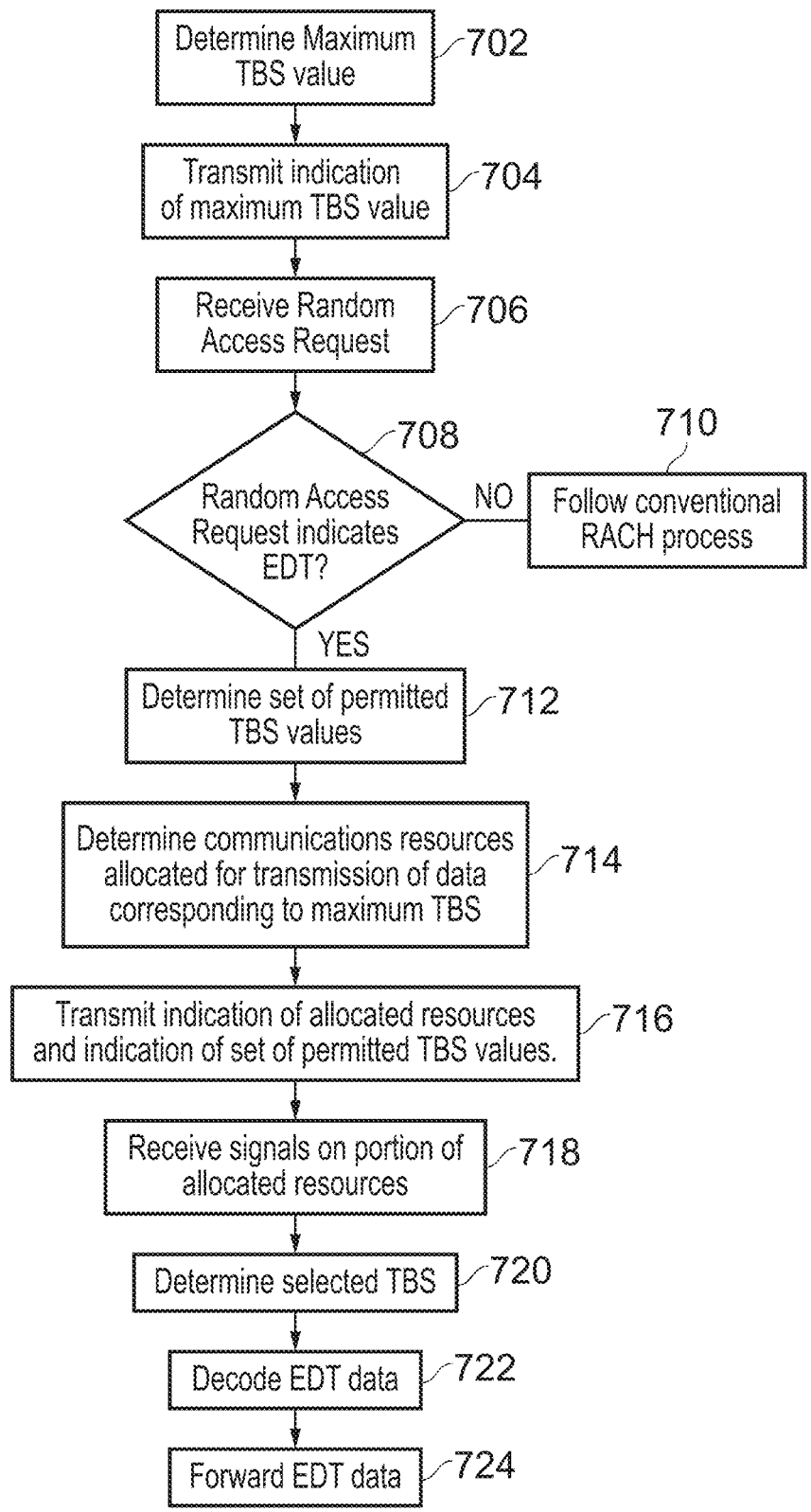
FIG. 7 is a flow diagram representing a process which may be carried out by an infrastructure equipment in accordance with example embodiments of the present technique.

FIG. 7 is a flow diagram representing a process which may be carried out by an infrastructure equipment, such as the base station 101, in accordance with example embodiments of the present technique. The process illustrated in FIG. 7 will be explained with reference to FIG. 5.

The process starts at step 702, in which the base station 101 determines the maximum TBS value.

At step 704, the base station 101 transmits an indication of the maximum TBS value to the terminal device 104, for example, by means of the broadcast system information message 502.

In step 706, the base station 101 receives on the random access channel the random access request 504 transmitted by the terminal device 104. In step 708, the base station 101 may determine whether the random access request is indicative of an initiation by the transmitting terminal device 104 of an early data transmission (EDT) procedure. For example, the base station 101 may determine that the preamble of the random access request 504 corresponds to one of a predetermined set of preambles which indicate an EDT procedure.

If at step 708, the base station 101 determines that the random access request 504 does not indicate an EDT procedure, the control passes to step 710 and a conventional RACH procedure is followed, for example, resulting in the establishment of an RRC connection.

If at step 708 the base station 101 determines that the random access request 504 does indicate an EDT procedure, the control passes to step 712.

At step 712, the base station 101 determines a set of permitted TBS values. For example, the set of permitted TBS values may comprise up to four values, each of which is lower than or equal to the maximum TBS. In some embodiments, the set of permitted TBS values includes the maximum TBS value.

In some embodiments, the base station 101 is preconfigured (e.g. by an operator of the wireless telecommunications system) with the set of permitted TBS values. The preconfigured set of permitted TBS values may be determined based on applications which may be expected to use (or trigger) EDT procedures for the transmission of a certain amount of data within the wireless telecommunications system. For example, in a particular wireless telecommunications system providing service to a particular type of IoT equipment, it may be determined that terminal devices may frequently determine that 500 bits is to be transmitted. One of the set of permitted TBS values set by base stations in that wireless telecommunications system may accordingly be set to 500 bits or slightly higher, to minimize additional padding for such transmissions.

According to some embodiments of the present technique, adaptive techniques (which may be based on procedures for self-optimizing network (SON) or minimization of drive tests (MDT)) may be used within the wireless telecommunications system to set the set of permitted IBS values based on observations (for example, by the base station 101 or by one or more terminal devices) of previously transmitted data. For example, it may be detected that a high number of data transmissions comprise, in addition to padding, 460 bits of data. Based on the detection, the set of permitted TBS values may be adjusted so that such transmissions require a small amount of padding, for example, by setting one of the set of permitted TBS values to a next highest TBS value from the set of preferred TBS values.

The set of permitted TBS values may be determined separately for each base station, or for each cell provided by a base station.

In some embodiments, the set of permitted TBS values is determined based on a geographic coverage of the cell.

Subsequently, at step 714, the base station 101 allocates communications resources to the terminal device 104 for the transmission of an amount of data corresponding to the maximum TBS value.

At step 716, the base station 101 transmits to the terminal device 104 an indication of the allocated communications resources and an indication of the set of permitted TBS values. For example, these indications may be transmitted in the random access response message 506.

At step 718, the base station 101 receives signals representing the data 508, transmitted by the terminal device 104 using a portion of the allocated communications resources.

The base station 101 then determines, at step 720, the selected TBS used by the terminal device 104 to transmit the data 508. The base station 101 may determine the selected TBS by performing a sequence of blind decoding attempts. For each blind decoding attempt, the base station 101 may assume that the terminal device 104 used a different portion (which may include all) of the allocated communications resources, and attempt to decode all, or a particular subset, of the signals which were received in the allocated communications resources accordingly.

The portions of allocated communications resources (and accordingly, the corresponding subsets of signals) may be determined in accordance with the example techniques described herein (such as in respect of step 416 of FIG. 4) by which the terminal device 104 determines, based on one or more of the maximum TBS value and the set of permitted TBS values, the communications resources which it is to use for the transmission of the EDT data 508.

After (or substantially coterminous with) the determination of the selected TBS at step 722, the base station 101 successfully decodes the EDT transmission 508 at step 724.

Finally, at step 726, the base station 101 forwards the EDT data as appropriate, for example, towards the core network 102.

In some embodiments of the present technique, the order of the steps illustrated in FIG. 7 may be different from those described above, and some of the steps may be omitted. For example, where the maximum TBS is predetermined and known (for example, as a result of standardisation) to the terminal device 104, then step 704 may be omitted.

Thus there has been described a method of operating a terminal device for transmitting a first amount of data, the method comprising receiving an indication of an allocation of communications resources, the allocated communications resources sufficient for transmitting a second amount of data, the second amount of data greater or equal to than the first amount of the data; selecting from a plurality of permitted TBS values a transport block size, TBS, for the transmission of the first amount of data, based on the first amount; determining communications resources for transmitting the first amount of the data based on the selected TBS and the allocated communications resources; and transmitting the first amount of the data using the determined communications resources.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of terminal device, but can be applied more generally in respect of any types of terminal device, for example the approaches are not limited to machine type communication devices/IoT devices or other narrowband terminal devices, but can be applied more generally, for example in respect of any type terminal device operating with a wireless link to the communication network.

It will further be appreciated that the principles described herein are not applicable only to LTE-based wireless telecommunications systems, but are applicable for any type of wireless telecommunications system that supports a random access procedure comprising an exchange of random access procedure messages between a terminal device and a base station.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a terminal device for transmitting a first amount of data, the method comprising: receiving an indication of an allocation of communications resources, the allocated communications resources sufficient for transmitting a second amount of data, the second amount of data greater than or equal to the first amount of the data; selecting a transport block size, TBS, for the transmission of the first amount of data, based on the first amount; determining communications resources for transmitting the first amount of the data based on the selected TBS and the allocated communications resources; and transmitting the first amount of the data using the determined communications resources.

Paragraph 2. A method according to Paragraph 1, the method comprising: receiving an indication of a maximum TBS value, and wherein the second amount of data corresponds to the maximum TBS value and the selected TBS is selected based on the maximum TBS value.

Paragraph 3. A method according to Paragraph 1 or Paragraph 2, the method comprising: transmitting a random access request on a random access channel: and receiving the indication of the allocation of the communications resources in a message transmitted in response to the random access request.

Paragraph 4. A method according to any of Paragraphs 1 to 3, the method comprising: determining a plurality of permitted TBS values, wherein each of the permitted TBS values is no larger than the second amount and wherein the selected TBS is selected from the plurality of permitted TBS values.

Paragraph 5. A method according to Paragraph 4, the method comprising: receiving a permitted TBS values set indication, and wherein the plurality of permitted IBS values are determined based on the permitted TBS values set indication.

Paragraph 6. A method according to any of Paragraphs 1 to 5, the method comprising: determining a first repetition number, the first repetition number being a maximum number of times that the second amount of data can be transmitted using the allocated communications resources; determining a second repetition number based on the first repetition number and the selected TBS, wherein the second repetition number is lower than the first repetition number, and wherein the transmitting the first amount of the data using the determined communications resources is in accordance with the second repetition number.

Paragraph 7. A method according to Paragraph 6 wherein the determined communications resources comprise a plurality of discontinuous transmission, DTX, on time periods.

Paragraph 8. A method according to any of Paragraphs 1 to 7, wherein the allocated communications resources comprise an allocated transmission power, the determined communications resources comprise a selected transmission power, the selected transmission power lower than the allocated transmission power.

Paragraph 9. A method according to any of Paragraphs 1 to 8, wherein the allocated communications resources comprise a first number of physical resource blocks, PRBs, each PRB being characterised by a time period and a predetermined frequency range.

Paragraph 10. A method according to Paragraph 9, wherein the determined communications resources comprise a second number of PRBs, the second number of PRBs lower than the first number of PRBs.

Paragraph 11. A method according to Paragraph 9, wherein in accordance with the allocated communications resources, no more than one physical resource block is allocated to the terminal device at any given time; and the determined communications resources comprise a plurality of sub-physical resource blocks, each of the sub-physical resource blocks characterised by a frequency range less than the predetermined frequency range.

Paragraph 12. A method of operating a network infrastructure equipment for receiving a first amount of data from a terminal device, the method comprising: transmitting to the terminal device an indication of an allocation of communications resources, the allocated communications resources sufficient for transmitting a second amount of data by the terminal device, receiving signals representing the first amount of the data, the signals transmitted by the terminal device using a portion of the allocated communications resources; and determining a selected transport block size, IBS, selected by the terminal device for the transmission of the first amount of the data based on the received signals, wherein the selected TBS is smaller than or equal to the second amount of data.

Paragraph 13. A method according to Paragraph 12, the method comprising: receiving a random access request transmitted by the terminal device on a random access channel; wherein the indication of the allocation of the communications resources is transmitted in response to receiving the random access request.

Paragraph 14. A method according to Paragraph 12 or Paragraph 13, the method comprising: determining a plurality of permitted TBS values; wherein the selected TBS is one of the plurality of permitted TBS values.

Paragraph 15. A method according to Paragraph 14, the method comprising: transmitting a permitted TBS values set indication, the permitted TBS values set indication together with a maximum TBS value indicating the plurality of permitted IBS values.

Paragraph 16. A method according to Paragraph 15, the method comprising: transmitting an indication of the maximum TBS value.

Paragraph 17. A method according to any of Paragraphs 12 to 16 wherein the portion of the allocated communications resources comprises a plurality of discontinuous transmission, DTX, on time periods.

Paragraph 18. A method according to any of Paragraphs 12 to 17, wherein the allocated communications resources comprise an allocated transmission power, the portion of the allocated communications resources comprises a selected transmission power, the selected transmission power lower than the allocated transmission power.

Paragraph 19. A method according to any of Paragraphs 12 to 18, wherein the allocated communications resources comprise a first number of physical resource blocks, PRBs, each PRB being characterised by a time period and a predetermined frequency range.

Paragraph 20. A method according to Paragraph 19, wherein the portion of the allocated communications resources comprises a second number of PRBs, the second number of PRBs lower than the first number of PRBs.

Paragraph 21. A method according to Paragraph 19, wherein in accordance with the allocated communications resources, no more than one physical resource block is allocated to the terminal device at any given time; and the portion of the allocated communications resources comprises a plurality of sub-physical resource blocks, each of the sub-physical resource blocks characterised by a frequency range less than the predetermined frequency range.

Paragraph 22. A method according to any of Paragraphs 12 to 16, wherein the portion of the allocated communications resources is the allocated communications resources.

Paragraph 23. A terminal device for transmitting a first amount of data, wherein the terminal device comprises controller circuitry and transceiver circuitry configured such that the terminal device is operable: to receive an indication of an allocation of communications resources, the allocated communications resources sufficient for transmitting a second amount of data, the second amount of data greater than or equal to the first amount of the data; to select a transport block size, TBS, for the transmission of the first amount of data, based on the first amount; to determine communications resources for transmitting the first amount of the data based on the selected TBS and the allocated communications resources; and to transmit the first amount of the data using the determined communications resources.

Paragraph 24. Circuitry for a terminal device for transmitting a first amount of data, wherein the circuitry comprises controller circuitry and transceiver circuitry configured such that the terminal device is operable: to receive an indication of an allocation of communications resources, the allocated communications resources sufficient for transmitting a second amount of data, the second amount of data greater than or equal to the first amount of the data; to select a transport block size, TBS, for the transmission of the first amount of data, based on the first amount; to determine communications resources for transmitting the first amount of the data based on the selected TBS and the allocated communications resources; and to transmit the first amount of the data using the determined communications resources.

Paragraph 25. A network infrastructure equipment for receiving a first amount of data from a terminal device, wherein the infrastructure equipment comprises controller circuitry and transceiver circuitry configured such that the network infrastructure equipment is operable: to transmit to the terminal device an indication of an allocation of communications resources, the allocated communications resources sufficient for transmitting a second amount of data by the terminal device, to receive signals representing the first amount of the data, the signals transmitted by the terminal device using a portion of the allocated communications resources; and to determine a selected transport block size, TBS, selected by the terminal device for the transmission of the first amount of the data based on the received signals, wherein the selected TBS is smaller than or equal to the second amount of data.

Paragraph 26. Circuitry for a network infrastructure equipment for receiving a first amount of data from a terminal device, wherein the circuitry comprises controller circuitry and transceiver circuitry configured such that the network infrastructure equipment is operable: to transmit to the terminal device an indication of an allocation of communications resources, the allocated communications resources sufficient for transmitting a second amount of data by the terminal device, to receive signals representing the first amount of the data, the signals transmitted by the terminal device using a portion of the allocated communications resources; and to determine a selected transport block size, IBS, selected by the terminal device for the transmission of the first amount of the data based on the received signals, wherein the selected TBS is smaller than or equal to the second amount of data.

REFERENCES

[1] RP-161464, "Revised WID for Further Enhanced MTC for LTE," Ericsson, 3GPP TSG RAN Meeting #73, New Orleans, USA, Sep. 19-22, 2016
[2] RP-161901, "Revised work item proposal: Enhancements of NB-IoT", Huawei, HiSilicon, 3GPP TSG RAN Meeting #73, New Orleans, USA, Sep. 19-22, 2016
[3] RP-170732, "New WID on Even further enhanced MTC for LTE," Ericsson, Qualcomm, 3GPP TSG RAN Meeting #75, Dubrovnik, Croatia, Mar. 6-9, 2017
[4] RP-170852, "New WID on Further NB-IoT enhancements," Huawei, HiSilicon, Neul, 3GPP TSG RAN Meeting #75, Dubrovnik, Croatia, Mar. 6-9, 2017
[5] Holma H. and Toskala A, "LTE for UMTS OFDMA and SC-FDMA based radio access", John Wiley and Sons, 2009
[6] 3GPP TS 36.213 "Physical layer procedures (Rel-14)"

The invention claimed is:
1. Circuitry for a terminal device for transmitting a first amount of data, the circuitry comprising:
controller circuitry and transceiver circuitry configured together to:
receive an indication of an allocation of communications resources, the allocated communications resources sufficient for transmitting a second amount of data, the second amount of data greater than or equal to the first amount of the data;

select a transport block size TBS for the transmission of the first amount of data, based on the first amount;
determine communications resources for transmitting the first amount of the data based on the selected TBS and the allocated communications resources; and
transmit the first amount of the data using the determined communications resources.

2. The circuitry of claim 1, wherein the controller circuitry is configured to determine a plurality of permitted TB S values, wherein each of the permitted TBS values is no larger than the second amount.

3. The circuitry of claim 2, wherein
the controller circuitry and transceiver circuitry are configured to receive a permitted TBS values set indication, and
the plurality of permitted TBS values are determined based on the permitted TBS values set indication.

4. The circuitry of claim 2, wherein the controller circuitry is configured to select the TBS for the transmission of the first amount of data based from the plurality of permitted TBS values.

5. The circuitry of claim 1, wherein the controller circuitry and transceiver circuitry are configured to receive an indication of a maximum TBS value, the second amount of data corresponds to the maximum TBS value, and the selected TBS is selected based on the maximum TBS value.

6. The circuitry of claim 1, wherein the controller circuitry and transceiver circuitry are configured to:
transmit a ran random access request on a random access channel; and
receive the indication of the allocation of the communications resources in a message transmitted in response to the random access request.

7. The circuitry of claim 1, wherein the controller circuitry and transceiver circuitry are configured to:
determine a first repetition number, the first repetition number being a maximum number of times that the second amount of data can be transmitted using the allocated communications resources;
determine a second repetition number based on the first repetition number and the selected TBS, wherein the second repetition number is lower than the first repetition number; and
transmit the first amount of data in accordance with the second repetition number.

8. The circuitry of claim 7, wherein the determined communications resources comprise a plurality of discontinuous transmission (DTX) on time periods.

9. The circuitry of claim 1, wherein
the allocated communications resources comprise an allocated transmission power, and
the determined communications resources comprise a selected transmission power, the selected transmission power being lower than the allocated transmission power.

10. A network infrastructure equipment for receiving a first amount of data from a terminal device, the network infrastructure equipment comprising:
circuitry configured to
transmit to the terminal device an indication of an allocation of communications resources, the allocated communications resources sufficient for transmitting a second amount of data by the terminal device;
receive signals representing the first amount of the data, the signals transmitted by the terminal device using a portion of the allocated communications resources; and
determine a selected transport block size TB S selected by the terminal device for the transmission of the first amount of the data based on the received signals, wherein the selected TBS is smaller than or equal to the second amount of data.

11. The network infrastructure equipment of claim 10, wherein the allocated communications resources comprise a first number of physical resource blocks (PRBs), each PRB being characterized by a time period and a predetermined frequency range.

12. The network infrastructure equipment of claim 11, wherein the portion of the allocated communications resources comprises a second number of PRBs, the second number of PRBs lower than the first number of PRBs.

13. The network infrastructure equipment of claim 11, wherein
in accordance with the allocated communications resources, no more than one physical resource block is allocated to the terminal device at any given time; and
the portion of the allocated communications resources comprises a plurality of sub-physical resource blocks, each of the sub-physical resource blocks characterized by a frequency range less than the predetermined frequency range.

14. The network infrastructure equipment of claim 10, wherein the circuitry is configured to:
receive a random access request transmitted by the terminal device on a random access channel; and
transmit the indication of the allocation of the communications resources in response to receiving the random access request.

15. The network infrastructure equipment of claim 10, wherein
the circuitry is configured to determine a plurality of permitted TBS values, and
the selected TBS is one of the plurality of permitted TBS values.

16. The network infrastructure equipment of claim 15, wherein the circuitry is configured to transmit a permitted TBS values set indication, the permitted TBS values set indication together with a maximum TB S value indicating the plurality of permitted TBS values.

17. The network infrastructure equipment of claim 16, wherein the circuitry is configured to transmit an indication of the maximum TBS value.

18. The network infrastructure equipment of claim 10, wherein the portion of the allocated communications resources comprises a plurality of discontinuous transmission (DTX) on time periods.

19. The network infrastructure equipment of claim 10, wherein
the allocated communications resources comprise an allocated transmission power, and
the portion of the allocated communications resources comprises a selected transmission power, and
the selected transmission power is lower than the allocated transmission power.

20. Circuitry for a network infrastructure equipment for receiving a first amount of data from a terminal device, the circuitry comprising:
controller circuitry and transceiver circuitry configured together to:

transmit to the terminal device an indication of an allocation of communications resources, the allocated communications resources sufficient for transmitting a second amount of data by the terminal device;

receive signals representing the first amount of the data, the signals transmitted by the terminal device using a portion of the allocated communications resources; and determine a selected transport block size TBS selected by the terminal device for the transmission of the first amount of the data based on the received signals, wherein the selected TBS is smaller than or equal to the second amount of data.

* * * * *